(12) United States Patent
Vargas et al.

(10) Patent No.: US 9,712,521 B2
(45) Date of Patent: Jul. 18, 2017

(54) DYNAMIC SECURE LOGIN AUTHENTICATION

(71) Applicant: PAYPAL, INC., San Jose, CA (US)

(72) Inventors: Luis Vargas, San Jose, CA (US);
Vishal Aggarwal, Haryana (IN);
Yogesh Kandlur, Reno, NV (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/822,834

(22) Filed: Aug. 10, 2015

(65) Prior Publication Data

US 2015/0350192 A1 Dec. 3, 2015

Related U.S. Application Data

(63) Continuation of application No. 13/607,380, filed on Sep. 7, 2012, now Pat. No. 9,104,855.

(51) Int. Cl.
| | |
|---|---|
| H04L 29/06 | (2006.01) |
| G06F 21/46 | (2013.01) |
| G06F 21/31 | (2013.01) |
| G06F 21/36 | (2013.01) |
| G06F 21/60 | (2013.01) |

(52) U.S. Cl.
CPC ............ H04L 63/083 (2013.01); G06F 21/31 (2013.01); G06F 21/36 (2013.01); G06F 21/46 (2013.01); G06F 21/606 (2013.01)

(58) Field of Classification Search
CPC ....... H04L 63/083; G06F 21/46; G06F 21/31; G06F 21/36; G06F 21/606
See application file for complete search history.

(56) References Cited

U.S. PATENT DOCUMENTS

| 5,091,939 A | 2/1992 | Cole et al. |
|---|---|---|
| 6,546,392 B1 | 4/2003 | Bahlmann |
| 6,571,336 B1 * | 5/2003 | Smith, Jr. ............... G06F 21/46 380/44 |
| 7,644,868 B2 | 1/2010 | Hare |
| 7,921,454 B2 | 4/2011 | Cerruti et al. |
| 8,191,126 B2 * | 5/2012 | Raghavan ............... G06F 21/36 726/7 |
| 8,307,424 B2 | 11/2012 | Hirakawa |
| 8,375,428 B2 | 2/2013 | Won et al. |

(Continued)

*Primary Examiner* — Joseph P Hirl
*Assistant Examiner* — J. Brant Murphy
(74) *Attorney, Agent, or Firm* — Haynes and Boone, LLP (57) ABSTRACT

A system for performing a secured transaction using a network including a server in communication with the network is provided. The server has a processor and a memory to store private account information from registered users and store commands that when executed by the processor cause the server to perform a method including: providing a login configuration to a user, including a matrix of dynamic symbols; determining an expected password for the user based on a trace pattern from the user and the symbols in the matrix; receiving a password from the user; and determining whether the password matches the expected password. A non-transitory machine-readable medium including a plurality of machine-readable instructions which when executed by one or more processors of a server controlled by a service provider are adapted to cause the server to perform a method as above is also provided.

20 Claims, 6 Drawing Sheets

(56) References Cited

U.S. PATENT DOCUMENTS

| | | | |
|---|---|---|---|
| 8,392,975 B1* | 3/2013 | Raghunath | G06F 17/30265 726/19 |
| 8,429,730 B2 | 4/2013 | Mardikar et al. | |
| 8,448,225 B2 | 5/2013 | Kijima | |
| 8,504,842 B1* | 8/2013 | Meacham | G06F 3/0488 713/182 |
| 8,875,267 B1* | 10/2014 | Kolman | H04L 63/08 709/203 |
| 8,947,197 B2* | 2/2015 | Craymer | G06Q 20/341 340/5.2 |
| 2002/0104005 A1* | 8/2002 | Yin | G06F 21/36 713/185 |
| 2005/0015604 A1 | 1/2005 | Sundararajan et al. | |
| 2005/0177750 A1 | 8/2005 | Gasparini et al. | |
| 2006/0041932 A1 | 2/2006 | Cromer et al. | |
| 2007/0157299 A1* | 7/2007 | Hare | G06F 21/36 726/9 |
| 2007/0178501 A1 | 8/2007 | Rabinowitz et al. | |
| 2007/0265861 A1* | 11/2007 | Meir-Levi | G06Q 40/02 379/91.01 |
| 2008/0086644 A1* | 4/2008 | Beck | G06F 21/31 713/183 |
| 2008/0141351 A1* | 6/2008 | Park | G06F 21/31 726/5 |
| 2008/0141362 A1* | 6/2008 | Torres | G06F 21/36 726/18 |
| 2008/0222417 A1* | 9/2008 | Downes | G06F 21/36 713/172 |
| 2009/0037986 A1* | 2/2009 | Baker | G06F 21/31 726/5 |
| 2009/0158424 A1* | 6/2009 | Yang | G06F 21/36 726/19 |
| 2010/0071060 A1 | 3/2010 | Lin | |
| 2010/0158327 A1* | 6/2010 | Kangas | G06F 21/316 382/124 |
| 2010/0161399 A1 | 6/2010 | Posner et al. | |
| 2010/0281526 A1* | 11/2010 | Raghavan | H04L 63/083 726/7 |
| 2011/0004533 A1 | 1/2011 | Soto et al. | |
| 2011/0004928 A1* | 1/2011 | Won | G09C 1/00 726/7 |
| 2011/0016520 A1* | 1/2011 | Cohen | G06F 21/36 726/19 |
| 2011/0143711 A1* | 6/2011 | Hirson | G06Q 20/32 455/410 |
| 2011/0191592 A1* | 8/2011 | Goertzen | G06F 21/36 713/182 |
| 2011/0264460 A1 | 10/2011 | Jagemann et al. | |
| 2012/0116921 A1* | 5/2012 | Fogel | G06Q 10/0633 705/26.81 |
| 2012/0117455 A1 | 5/2012 | Fogel et al. | |
| 2012/0144461 A1 | 6/2012 | Rathbun | |
| 2012/0252410 A1* | 10/2012 | Williams | G06F 21/36 455/411 |
| 2013/0036458 A1 | 2/2013 | Liberman et al. | |
| 2013/0125214 A1 | 5/2013 | Jakobsson | |
| 2013/0167212 A1 | 6/2013 | Azar et al. | |
| 2013/0174240 A1* | 7/2013 | Bidare | H04L 9/3271 726/7 |
| 2013/0211944 A1 | 8/2013 | Momin et al. | |
| 2013/0263237 A1 | 10/2013 | Kumaraswamy | |
| 2013/0318598 A1 | 11/2013 | Meacham | |

* cited by examiner

DYNAMIC SECURE LOGIN AUTHENTICATION

CROSS-REFERENCE TO RELATED APPLICATION

This application is a continuation of and claims priority to U.S. patent application Ser. No. 13/607,380, filed Sep. 7, 2012, which is incorporated herein by reference in its entirety.

BACKGROUND

1. Technical Field

Embodiments disclosed herein relate generally to the field of secure authentication for private account service providers over a network. More particularly, embodiments disclosed herein relate to the field of password authentication for user login.

2. Description of Related Art

Private account service providers over a network have proliferated in the past few years. Typically, users and customers have multiple accounts relating to different service providers; each account associated to a user name or login ID, and a password. As internet access becomes more prevalent, so does the desire for users to access secure private accounts in multiple locations, at any time of day. Typically, users are required to remember long password strings to access a private account over a network. This has led to users choosing the same password for multiple accounts in different service providers, or choosing simple character strings easy to remember, with the consequent compromise in account security. In many instances, the multiplicity of complex passwords induces the user to decline or postpone a transaction involving a service provided through the network. Such loss of a transaction opportunity translates in revenue loss for the service provider and for vendors, in addition to user frustration.

Attempts to overcome these shortcomings include the use of additional pieces of hardware ("keys") that the user carries around in order to store a password. Some examples include ID cards and memory sticks. While this approach removes the need for the user to memorize multiple passwords, it requires the user to carry around extra pieces of hardware that have a cost and may be easily lost, stolen, or mishandled by a third party.

What is needed is an alternative method of providing login authentication to users of a private account service provider that is simple to operate and is highly secure.

BRIEF DESCRIPTION OF THE DRAWINGS

In the figures, elements having the same reference number have the same or similar functions.

DETAILED DESCRIPTION

In the field of password authentication for user login, the need for highly secure login configurations often runs opposite simplicity and ease of use. Typically, login configurations that are 'user friendly' result in compromised security of the login access. Embodiments disclosed herein provide a simple mechanism to obtain a dynamic password that enhances the security of the login configuration. The mechanism is simple in that it uses traces or patterns on matrices displayed to the users to create a different password for every login event. Such is the concept of a dynamic password, which enhances the security of the login configuration.

According to some embodiments a system for performing a secured transaction using a network may include a server in communication with the network, the server having a processor circuit and a memory circuit; wherein: the memory circuit stores private account information from registered users; and the memory circuit stores commands that when executed by the processor circuit cause the server to perform a method including: providing a login configuration to a user, the login configuration including a matrix of dynamic symbols; determining an expected password for the user based on a trace pattern provided by the user and the symbols in the matrix; receiving a password from the user; and determining whether the password matches the expected password.

According to some embodiments, a non-transitory machine-readable medium may include a plurality of machine-readable instructions which when executed by one or more processors of a server controlled by a service provider are adapted to cause the server to perform a method including: receiving a user identifier; accessing an account of a user based on the user identifier; providing a matrix of cells to the user, wherein at least a plurality of the cells includes a dynamic symbol; receiving a password from the user; comparing the password with an expected password for the user based on a stored trace pattern for the user and the symbols in the cells; and authorizing the user if the password matches with the expected password.

According to some embodiments, a method to login into a user account of a service provider linked to a network to complete a transaction through the network may include: requesting, electronically by a processor in a server, a login information from a user; when login information is available requesting an account password; when the account password is not available providing, electronically by the processor in the server, a matrix pattern option; generating a matrix of dynamic symbols; generating an expected password based on a stored trace pattern for the user and the dynamic symbols in the matrix; completing the transaction when a password received from the user matches the expected password.

These and other embodiments will be described in detail in relation to the following figures.

Figure 1:
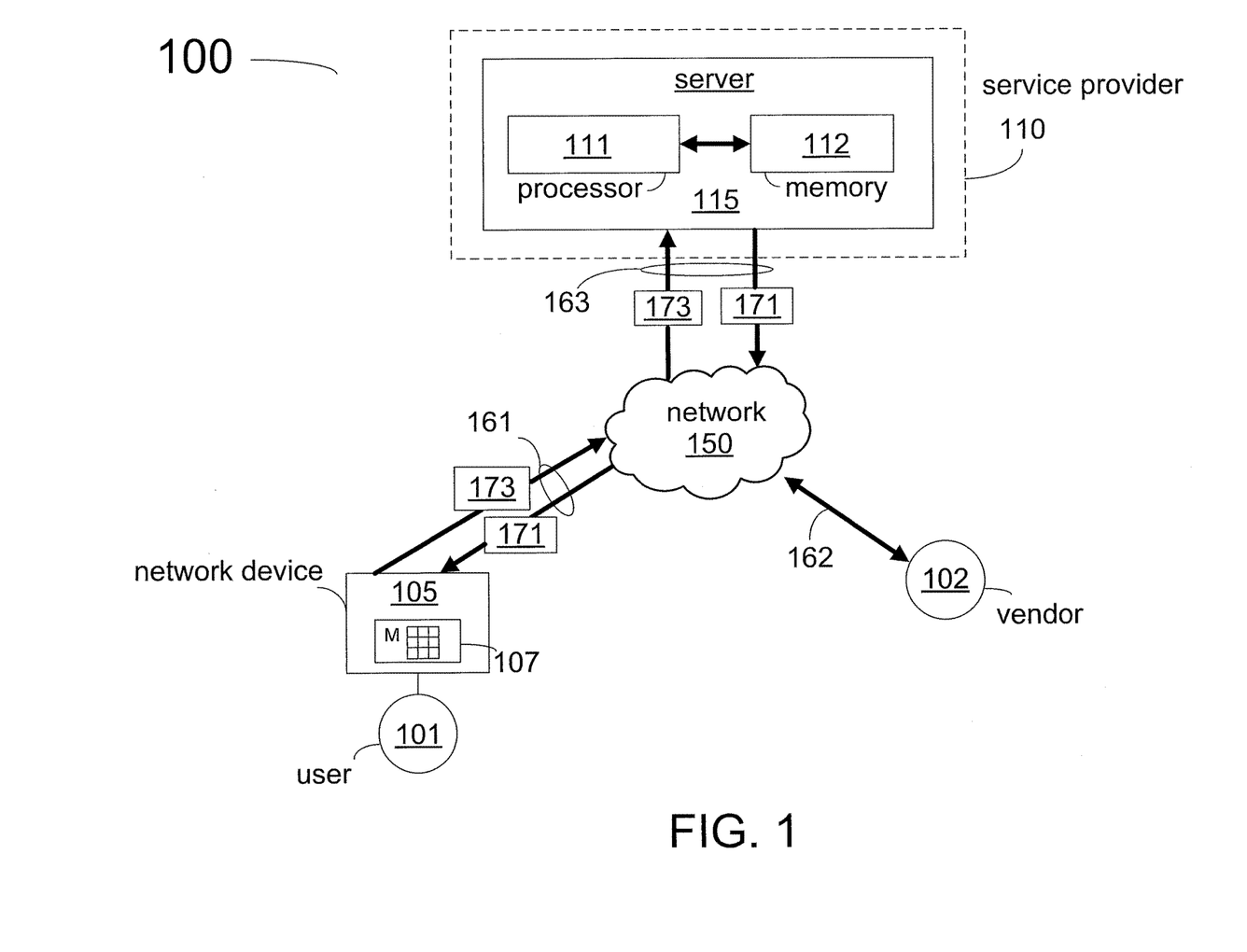
FIG. 1 shows a system for performing a secured transaction including a private account service provider, according to some embodiments.

FIG. 1 shows a system 100 for performing a secured transaction including a private account service provider 110, according to some embodiments. System 100 includes a user 101 having a private account with service provider 110. User 101 may be interested in purchasing an item offered by a vendor 102. Vendor 102 may have a website accessible through a network 150, the vendor's website including a catalogue or virtual outlet store. User 101 may have access to a vendor's catalogue or outlet through a network device 105. Network device 105 is able to connect with network 150 through a link 161. Network device 105 may be a cellular phone, a computer, a laptop computer, a smart phone, a computing tablet, or any other type of device configured to connect to network 150 via a wire or cable connection, or wirelessly. In some embodiments, network device 105 may include a display 107 so that graphic information may be presented to user 101. According to some embodiments, vendor 102 is connected to network 150 through a link 162, such that items for sale by vendor 102 may be accessed by user 101 through display 107 in network device 105. Service provider 110 includes a server 115 configured to access network 150 through a link 163. Server 115 includes at least one processor circuit 111 and a memory circuit 112.

Links 161, 162, and 163 may include wires, cables, optical fibers, wireless Radio-Frequency (RF) transceivers, Bluetooth, Near Field Communication (NFC) or any combination of the above. Thus, links 161, 162, and 163 may transmit electronic signals, optical signals, telecommunication signals, or RF signals, in digital or analogue form.

According to some embodiments, user 101 may access a private account handled by service provider 110 through network 150. The private account may include funds available to user 101 for purchasing an item for sale by vendor 102. The item for sale or lease may be a product of manufacturing or a service. According to embodiments consistent with the present disclosure, service provider 110 may provide a login configuration 171 to user 101 through links 163 and 161. In return, user 101 may provide login information 173 to service provider 110, through links 161 and 163.

In some embodiments, login configuration 171 includes a request for a login name and a password. Server 115 may store a table of passwords associated with login names of the private accounts registered with service provider 110 in memory circuit 112. Server 115 may have information regarding login names and passwords/PINs stored in memory circuit 112. Thus, login information 173 provided by user 101 may include the login name and the associated password requested. According to some embodiments, login configuration 171 may include a symbol matrix M shown in display 107. In some embodiments, symbol matrix M may be formed of characters selected from the American Standard Code for Information Interchange (ASCII) code and may include characters, numbers, letters, symbols, or combinations thereof (referred herein generally as symbols). Login information 173 may include a login name or ID, and a password including a string of characters selected by user 101 from matrix M.

Figure 2:
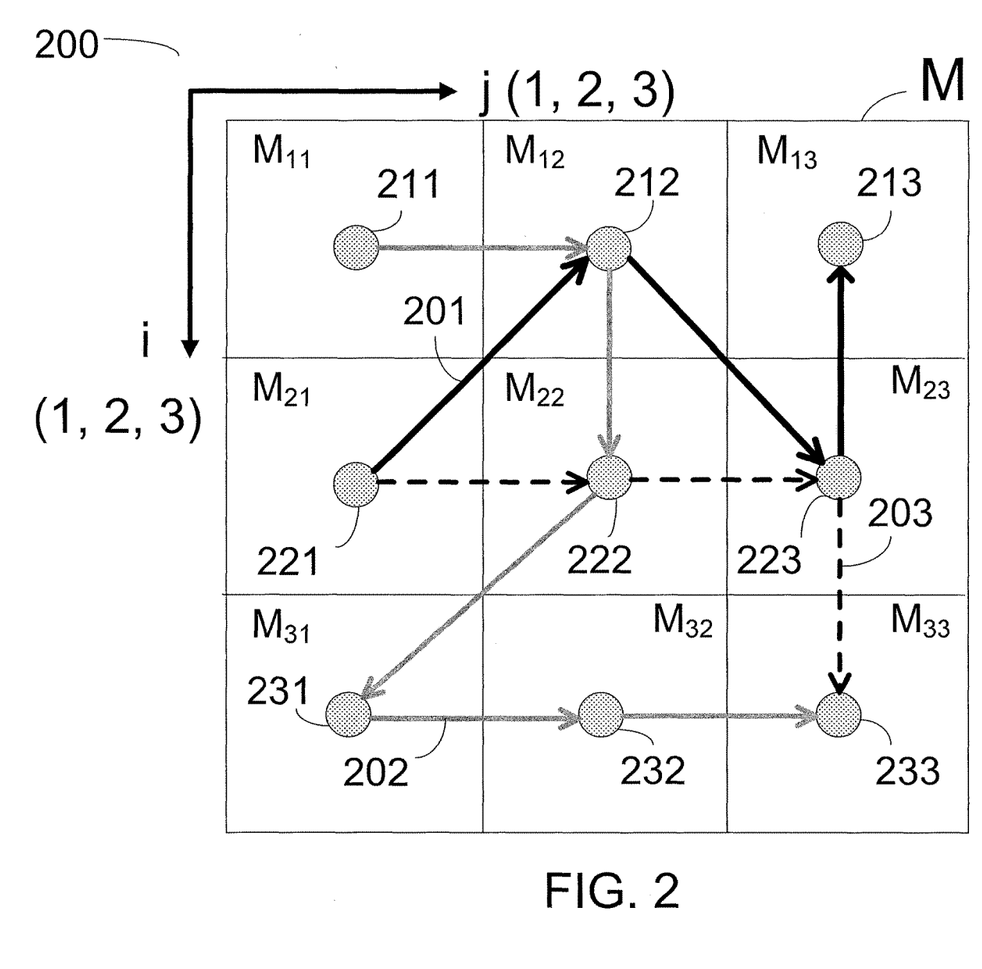
FIG. 2 shows a prompt for a password setup in a user account, according to some embodiments.

FIG. 2 shows a prompt 200 for a password setup in a user account, according to some embodiments. Prompt 200 is a matrix M, and in some embodiments it may be included in login configuration 171. In some embodiments, matrix M is a square matrix having 3×3, or 4×4 dimensions. Matrix M includes components M. Index T may refer to an i-th row in matrix M, and index 'j' may refer to a j-th column of matrix M. Prompt 200 may be shown on display 107 of network device 105 (cf. FIG. 1). In some embodiments, display 107 in network device 105 is a touch-sensitive screen such that user 101 may form a trace across matrix M by selecting touch sensitive portions of display 107 including matrix elements $M_{ij}$. For example, user 101 may form trace 201 by selecting cells 221, 212, 223, and 213. Trace 201 thus includes matrix elements $\{M_{21}, M_{12}, M_{23}, M_{13}\}$, in that order. Likewise, user 101 may form trace 202 by selecting cells 211, 212, 222, 231, 232, and 233. Trace 202 thus includes matrix elements $\{M_{11}, M_{12}, M_{22}, M_{31}, M_{32},$ and $M_{33}\}$, in that order. Further, user 101 may form trace 203 by selecting cells 221, 222, 223, and 233. Trace 203 thus includes matrix elements $\{M_{21}, M_{22}, M_{23},$ and $M_{33}\}$, in that order. In one embodiment, selection may be a continuous swipe across the matrix elements.

Each of traces 201, 202, and 203 thus selected includes patterns that are simple to remember by user 101. The pattern may be sent by user 101 to service provider 110 as part of login information 173 in a login configuration step for the user account with the service provider. According to some embodiments, user 101 may select one of patterns 201, 202, and 203 as part of a login configuration step. One of ordinary skill would recognize that matrix M in prompt 200 may have any number of columns and rows. The choice of M as a 3×3 matrix in FIG. 2 is arbitrary and not limiting over embodiments having matrices M with different dimensions. In some embodiments, matrix M may have a different number of columns and rows (i.e., not a square matrix). While some embodiments include patterns having a continuous trace including matrix elements that are geometrically adjacent to one another, other configurations may be possible. Furthermore, the number of matrix elements in the selected trace may be any number greater than one (1), and smaller than or equal to the total size of matrix M.

Accordingly, user 101 may select from any number of possible traces from matrix M, including traces forming a loop (i.e., with a repeated matrix element in the sequence). The larger the matrix dimensions, the greater the number of possibilities for user 101 to select a trace. For example, for a matrix M having 3×3 dimensions, the number of traces having matrix elements adjacent to one another having more than two (2) elements and less than ten (10) elements may be as high as about 350,000, or more.

User 101 may provide a login ID to service provider 110 in login information 173. Service provider 110 stores login information 173 in memory circuit 112. Thus, according to some embodiments, the user password in service provider 110 is associated with an ordered sequence of matrix elements. Service provider 110 uses processor circuit 111 to convert the ordered sequence of matrix elements into a password string. Moreover, while the ordered sequence of matrix elements remains the same for a plurality of transactions, the specific string of symbols or ASCII characters used for a password may be different for each transaction. The password generation process will be described in detail in relation to FIG. 3, below.

Figure 3:
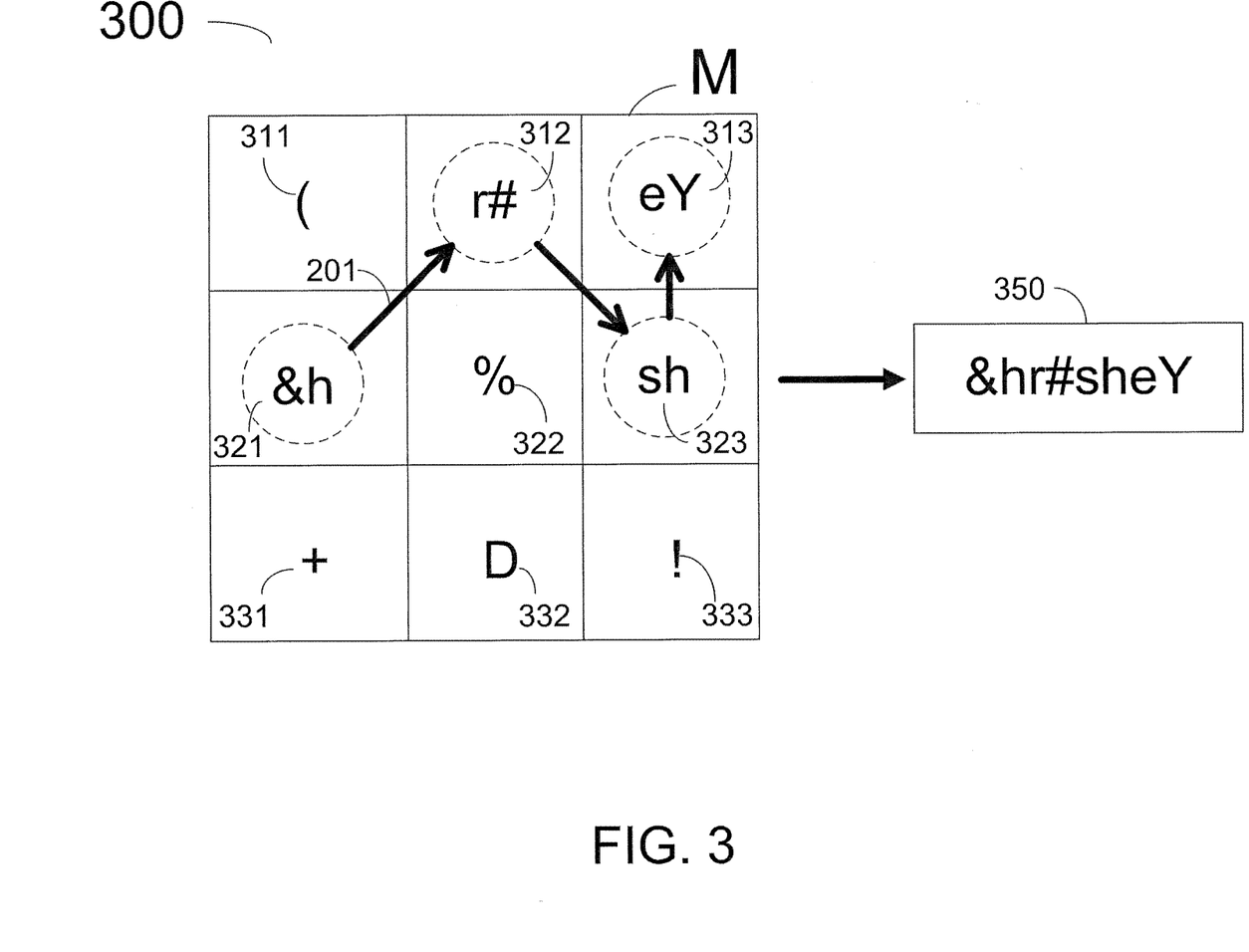
FIG. 3 shows a prompt for a password input in a user account, according to some embodiments.

FIG. 3 shows a prompt 300 for a password input in a user account, according to some embodiments. FIG. 3 is similar to FIG. 2, except that in FIG. 3 matrix elements $M_{11}$ through $M_{33}$ have been replaced by ASCII characters. In some embodiments, processor circuit 111 in server 115 may generate elements in matrix M by randomly selecting ASCII characters or any other symbol. Furthermore, processor circuit 111 may replace all of matrix elements in matrix M by new symbols and characters each time user 101 requests access to a private account in service provider 110. According to some embodiments, prompt 300 may be presented by service provider 110 to user 101 as part of login configuration 171. User 101 may recall the specific arrangement of trace 201 within matrix M, regardless of the symbol or character associated with each matrix element. User 101 may then form a password 350 by putting together symbols included in prompt 300 by service provider 110. The symbols selected and their sequence is determined by the selected trace. For example, in prompt 300 trace 201 including cells 321, 312, 323, and 313 will produce password 350 forming the string '&hr#sheY.' One of ordinary skill would recognize that the choice of symbols in matrix M is arbitrary. Moreover, as illustrated in FIG. 3, more than one symbol may be included in a cell. For example, cell 313 includes two symbols ('eY'). Thus, even when the user only remembers the simple shape of trace 201, a selection as illustrated in FIG. 3 provides a highly complex password when the user desires to access a private account. The symbols within the matrix may change each time or at different times user 101 is presented with an authentication request. Thus, the actual password entered by the user may be different at different times using the same recorded trace. This provides added security in that fraudsters viewing a user entering a password will not likely be able to use that same password to access the user's account or information.

Figure 4:
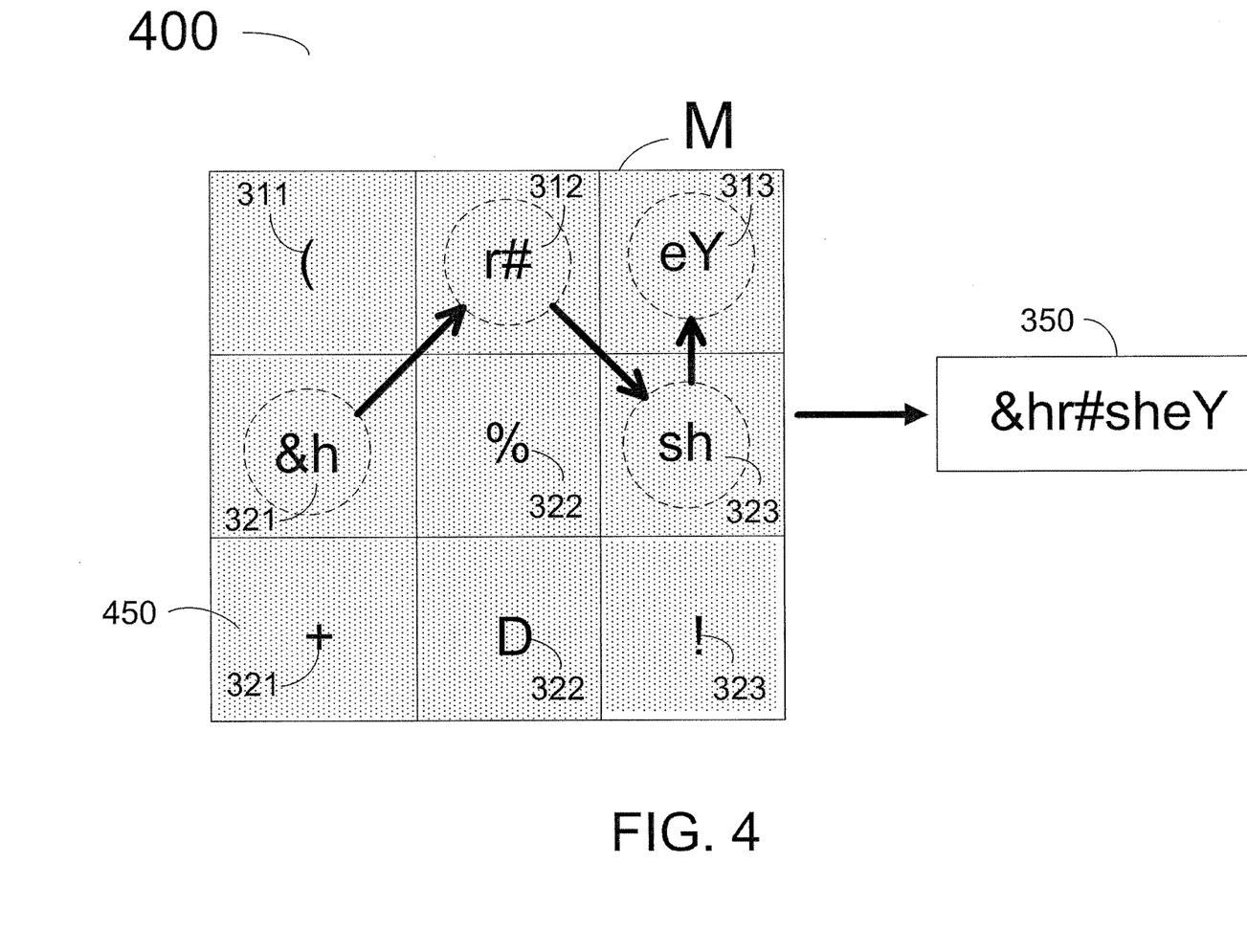
FIG. 4 shows a prompt for a password input in a user account, according to some embodiments.

FIG. 4 shows a prompt 400 for a password input in a user account, according to some embodiments. FIG. 4 is similar to FIG. 3 in all respects, except that prompt 400 includes background fill 450 in display 107. Background fill 450 is included in the display of matrix M. For example, background fill 450 may blur the symbols in matrix M to form password 350. While the net result in FIG. 4 is the same password 350 ('&hr#sheY'), the added benefit of embodiments including background fill 450 is that human correlation is necessary to arrive at password 350. Thus, the risk of computer-based or code-based counterfeiting is minimized.

In some embodiments, background fill 450 may be different for each matrix element $M_{ij}$, to enhance the ability of human recognition over automatic recognition strategies.

Figure 5:
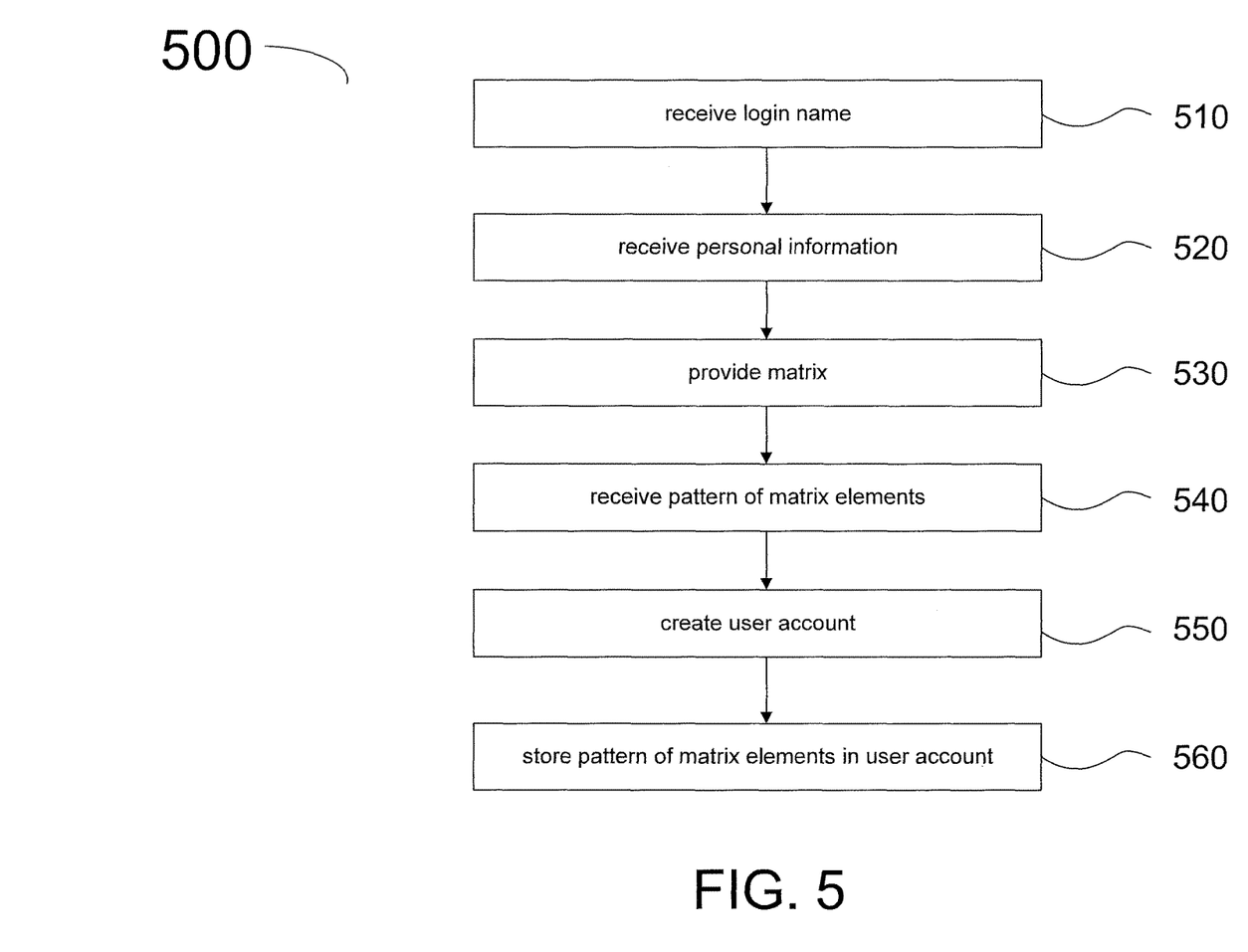
FIG. 5 shows a flow chart for a method to create a login configuration for a user account, according to some embodiments.

FIG. 5 shows a flow chart for a method 500 to create a login configuration for a user account, according to some embodiments. Method 500 may be performed by a service provider including a server that is able to connect to a network. The service provider may offer to create a private account for a user through the network. Thus, the service provider may handle user funds for purchasing items and other monetary transactions over the network. Accordingly, the service provider, the server, the network, and the user may be as service provider 110, server 115, network 150, and user 101, described in detail above (cf. FIG. 1). The server may be a computer including a processor circuit such as processor circuit 111, and a memory circuit such as memory circuit 112. In some embodiments, steps in method 500 may be performed by processor circuit 111 executing commands stored in memory circuit 112. Furthermore, some steps in method 500 may include the use by server 115 of link 163 to connect to vendor 102. User 101 may communicate with server 115 via network device 105, through network 150.

Method 500 may be performed by a service provider upon request by a user who desires to subscribe to the services offered by the service provider. For example, user 101 may want to create a private account with service provider 110 to manage funds in transactions over network 150. The transactions may involve items for sale or for lease by vendor 102. A login configuration in some embodiments of method 500 may include a login ID and a password. Furthermore, some embodiments may include a matrix M, and a pre-selected sequence of matrix elements in the login configuration, so that the user is not required to remember a password. Accordingly, the user is spared the continuous hassle of having to renew a forgotten password. A login configuration resulting from method 500 may be transmitted from the service provider to the user, for transactions at a later point in time. Such is the case in FIG. 1, where service provider 110 sends login configuration 171 to user 101 through network 150 and network device 105. Information received by the service provider from the user in method 500 may be stored in a memory circuit inside a server, such as memory circuit 112 in server 115.

Step 510 in method 500 includes receiving a login name (ID) from the user. In some embodiments, the login name may be an e-mail address for the user, or a cell phone number. In such cases, it is easy for a registered user to remember the login ID. In some embodiments, the login ID may be a personal identification number (PIN) or another simple character string that the user may remember easily.

Step 520 includes receiving personal information from the user. In some embodiments, step 520 may include receiving a legal first name of the user, a legal last name of the user, and the user's address including city, state, postal code, and telephone. Furthermore, step 520 may include receiving a bank account number and other personal financial information from the user, such as a fund transfer code. In some embodiments, step 520 may include receiving a password from the user.

Step 530 includes providing a matrix M to the user. Matrix M may be provided to a display in a network device accessed by the user, such as display 107 in network device 105. Thus, matrix M may be a matrix of cells in display 107, having fixed or arbitrary dimensions. In some embodiments, step 530 may include providing a prompt such as prompt 200 to display 107, to request the user to set up a pattern of matrix elements. The pattern of matrix elements requested may be as traces 201, 202, 203 (cf. FIG. 2) or any other pattern desired by the user. According to some embodiments, service provider 110 may suggest user 101 to select one from a group of patterns provided by the service provider 110. While the dimension of matrix M in prompt 200 is 3×3, one of ordinary skill would recognize that this dimension is not limiting, and a matrix M may have any desired dimension. In some embodiments matrix M may be rectangular, i.e., having different number of columns relative to the number of rows. Individual cells in the matrix may be empty and/or populated with a symbol.

Step 540 may include receiving a pattern of matrix elements from the user. The user may provide the pattern of matrix elements to the service provider via a link through a network such as link 161 through network 150 (cf. FIG. 1). For example, the user may use the user's finger, a stylus, a pointer, a mouse, or other means to trace a pattern in the matrix. The service provider may receive the pattern of matrix elements via a link through a network such as link 163 through network 150. According to some embodiments, the pattern of matrix elements received in step 540 may be as included in trace 201 {$M_{21}$, $M_{12}$, $M_{23}$, $M_{13}$}, in trace 202 {$M_{11}$, $M_{12}$, $M_{22}$, $M_{31}$, $M_{32}$, $M_{33}$}, in trace 203 {$M_{21}$, $M_{22}$, $M_{23}$, $M_{33}$}, or any other trace consistent with a prompt as described herein (cf. FIG. 2). In step 550, the service provider creates a user account with the information received from the user in steps 510-540. Step 560 includes storing the pattern of matrix elements in a memory circuit included in a server, such as memory circuit 112 in server 115.

It should be understood that traces 201, 202, and 203 are used for illustration purposes only, and are not limiting of embodiments consistent with the present disclosure. Thus, any other pattern of matrix elements chosen by user 101 may be provided to service provider 110 in step 540.

Figure 6:
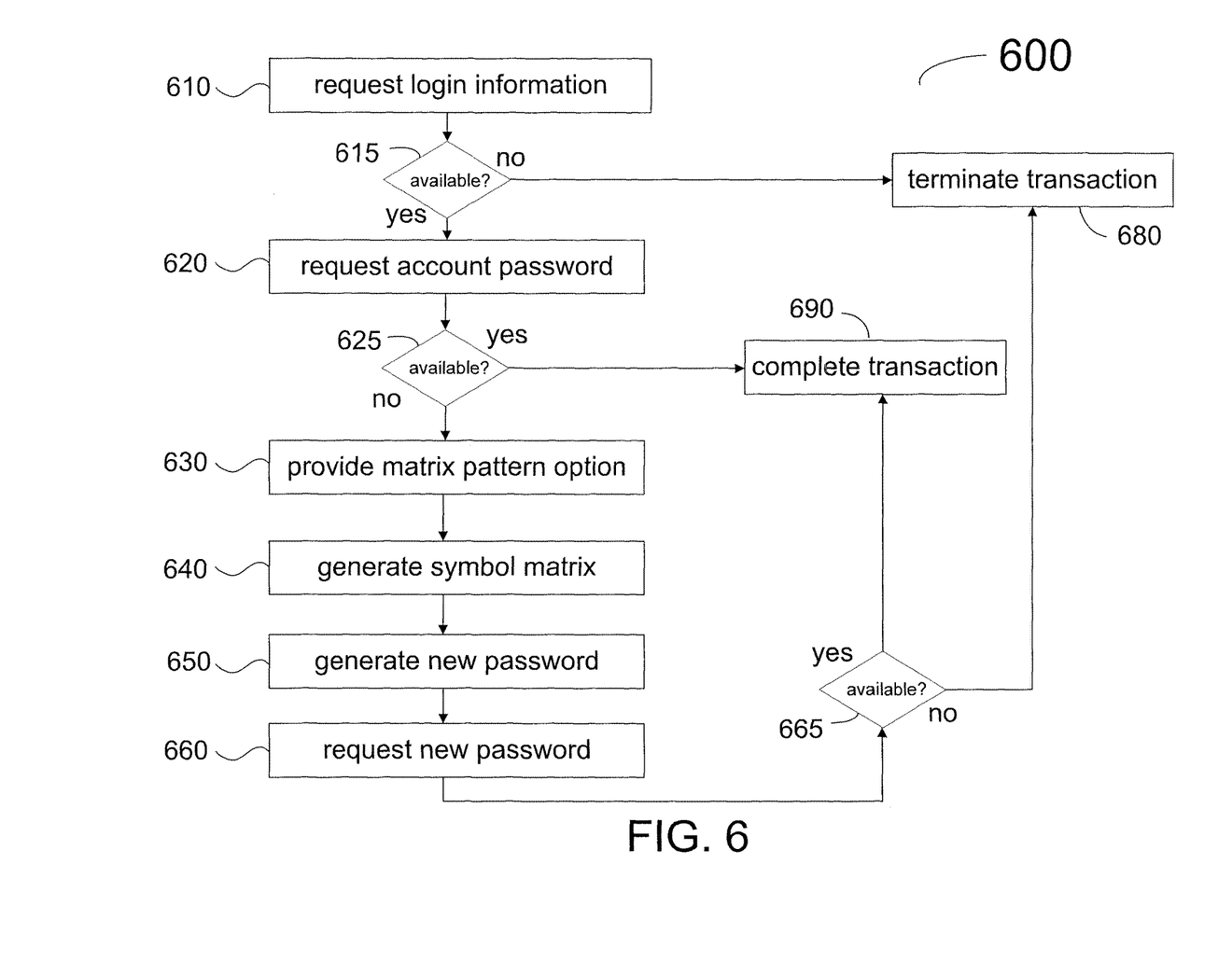
FIG. 6 shows a flow chart for a method to login into a user account, according to some embodiments.

FIG. 6 shows a flow chart for a method 600 to login into a user account, according to some embodiments. The user account in method 600 may be a private account held by a user in a service provider linked to a network. The user may be as user 101 accessing network device 105 linked to network 150 via link 161, and the service provider may be as service provider 110. The user private account information may be stored in memory circuit 112 of server 115. User private account information may be as obtained in method 500 above, including, but not limited to the following: a login ID, a password, a matrix pattern, and other personal information from user 101. Method 600 may be performed by service provider 110 using processor circuit 111 to execute commands stored in memory circuit 112. Method 600 may be initiated upon request by user 101 from a web page of a vendor 102, through network 150. Method 600 may also be initiated upon request by user 101 and a network device such as a mobile phone, tablet, hand-held computing device, smart phone, or similar. User 101 may desire to purchase an item offered for sale or lease in the vendor's web page using funds available in a private account with service provider 110.

Step 610 includes requesting login information from the user. Step 610 may include server 115 sending login configuration 171 to user's network device 105 via link 163, through network 150. In some embodiments, login information requested from the user may include a login ID, such as described in detail above, in relation to method 500.

When the login information is available in step 615, step 620 includes requesting an account password or presentation of matrix M on display 107. When the login information is not available in step 615, step 680 includes terminating the transaction. Optionally, in step 680 the transaction may be completed for user 101 as a guest, without logging into the user account. While such approach may incur in a risk of abuse of the system or default of user account for the transaction, server 110 may be able to assess the risk using processor circuit 111 and a purchase history of the user with the given login ID, stored in memory circuit 112. In some embodiments, user 101 may not recall the login ID for the private account, in which case the purchasing transaction between user 101 and vendor 102 may be terminated. Thus, step 680 may prevent the fraudulent use of a private account in service provider 110. In some embodiments, to avoid user frustration and sales loss to the merchants and service provider 110, an alternative guest login for user 101 may be provided, as described above. For example, in transactions below a certain threshold involving a well known or preferred merchant, user 101 may be allowed to proceed with the purchase upon later confirmation of user login information. The threshold may be determined by risk assessment algorithms stored in memory circuit 112 and performed by processor circuit 111.

When the account password is not available in step 625, in step 630 server 115 provides a matrix pattern option to log in. When the account password is available in step 625, the transaction is successfully completed in step 690. In step 690 service provider 110 may transfer funds from a user private account to a vendor private account, using processor circuit 111 and account information stored in memory circuit 112. In some embodiments, in step 690 service provider may credit the vendor private account in the amount of the transaction, and may also debit the user private account by the same or a similar amount. The matrix pattern option in step 630 prompts the user to input a dynamically generated password using a trace in a display of cells forming a matrix, M. For example, in some embodiments step 630 gives an option to the user to be presented with a matrix to input a dynamically generated password. The display of cells is shown in display 107 of network device 105. The user may have selected the trace at the time of registering a private account with service provider 110, such as in method 500 described in detail above.

In step 640, server 115 generates a symbol matrix. Server 115 may use processor circuit 111 and memory circuit 112 to perform step 640. In some embodiments, memory circuit 112 may have stored the dimensions of a matrix M used by user 101 to register a private account in service provider 110. Furthermore, memory circuit 112 may have stored a list of symbols or ASCII characters. Thus, in step 640 memory circuit 112 may provide a command to be executed by processor circuit 111 such that a matrix M is formed with randomly selected symbols or ASCII characters from a list in memory circuit 112. Step 640 may also include providing the symbol matrix generated by server 115 to user 101. For example, the symbol matrix may be included in login configuration 171 provided to display 107 in network device 105 via link 163, through network 150.

In some embodiments, step 640 may include placing a background fill to the symbol matrix in display 107 of network device 105. In some embodiments, step 640 may include displaying of matrix M as a picture/image. Thus, a parser program or another scanning device may not be able to decode the password encoded in the symbol matrix. A background fill provided in step 640 may be as background fill 450, described in detail above (cf. FIG. 4). Such embodiments may prevent the abuse of a system for secured transactions, such as system 100.

In step 650, server 115 generates a new password. Server 115 uses the pattern of matrix elements selected by the user at the time of registering a private account with service provider 110. Step 650 includes the selection by processor circuit 111 of the symbols in the matrix generated in step 640 corresponding to the matrix elements in the user-selected pattern. The user-selected pattern may be as obtained in method 500, stored in memory circuit 112, described in detail above.

In step 660, server 115 requests the new password from user 101. The new password as created by processor circuit 111 in server 115 may be transmitted in step 660 by user 101, provided that the user recalls the trace or pattern of matrix elements selected for the login configuration.

When the new password is available from the user in step 665 the transaction is successfully completed according to step 690 (see above). When the new password is not available in step 665, the transaction is terminated according to step 680.

Embodiments of the invention described above are exemplary only. One skilled in the art may recognize various alternative embodiments from those specifically disclosed. For example, the above description focused on a service provider handling an authentication for a user involved in a payment transaction with a vendor. However, the authentication/login schemes discussed herein can be implemented by retailers, government agencies, universities, schools, and any entity that may require a user to be authenticated before accessing certain information or taking an action. Those alternative embodiments are also intended to be within the scope of this disclosure. As such, the invention is limited only by the following claims.

What is claimed is:

1. A method comprising:
   obtaining login information from a user device for accessing a private account associated with a transaction, the private account associated with a predetermined pattern obtained from a predetermined trace applied to original symbols of an original matrix;

determining that the login information does not match private account authentication information of the private account;

in response to the determining that the login information does not match the private account authentication information, generating a user matrix with a plurality of dynamic symbols for an alternate authentication of the private account;

generating a system password from the dynamic symbols by applying the predetermined pattern on the user matrix;

presenting the user matrix with the plurality of dynamic symbols electronically on the user device;

receiving a user password obtained by applying a user-provided trace pattern on at least two of the dynamic symbols of the user matrix;

determining whether the system password matches the user password; and in response to a determination that the system password matches the user password, confirming the alternate authentication of the private account to allow processing of the transaction.

2. The method of claim 1, wherein presenting the user matrix further causes the user device to display a prompt for receiving the user-provided trace pattern.

3. The method of claim 1, wherein at least one of the dynamic symbols is different from the original symbols.

4. The method of claim 1, wherein an arrangement of the original symbols in the original matrix is different from an arrangement of the dynamic symbols in the user matrix.

5. The method of claim 1, wherein the dynamic symbols are generated randomly.

6. The method of claim 1, wherein presenting the user matrix further causes the user device to display background fill obscuring one or more of the dynamic symbols.

7. The method of claim 1, wherein the transaction is terminated when the user password matches the system password.

8. A non-transitory machine-readable medium having stored thereon machine-readable instructions executable to cause a machine to perform operations comprising:

requesting login information from a user device for accessing a private account associated with a transaction, the private account associated with a predetermined pattern obtained from a predetermined trace applied to original symbols of an original matrix;

determining that the login information does not match private account authentication information of the private account;

in response to the determining that the login information does not match the private account authentication information, generating a user matrix with dynamic symbols for an alternate authentication of the private account;

generating a system password from the dynamic symbols by applying the predetermined pattern on the user matrix;

presenting the user matrix with the dynamic symbols electronically on the user device;

receiving a user password obtained by applying a user-provided trace pattern on at least two of the dynamic symbols of the user matrix;

determining whether the system password matches the user password; and in response to a determination that the system password matches the user password, confirming the alternate authentication of the private account to allow processing of the transaction.

9. The non-transitory machine-readable medium of claim 8, wherein presenting the user matrix further causes the user device to display a prompt for receiving the user-provided trace pattern.

10. The non-transitory machine-readable medium of claim 8, wherein at least one of the dynamic symbols is different from the original symbols.

11. The non-transitory machine-readable medium of claim 8, wherein at least one of the original symbols is arranged differently in the original matrix from arrangement of the dynamic symbols in the user matrix.

12. The non-transitory machine-readable medium of claim 8, wherein the transaction is terminated when the user password does not match the system password.

13. The non-transitory machine-readable medium of claim 8, wherein the dynamic symbols are generated randomly.

14. The non-transitory machine-readable medium of claim 8, wherein presenting the user matrix further causes the user device to display background fill obscuring one or more of the dynamic symbols.

15. A system comprising:

a non-transitory memory; and one or more hardware processors coupled to the non-transitory memory and configured to execute instructions from the non-transitory memory to perform operations comprising:

requesting login information from a user device for accessing a private account associated with a transaction, the private account associated with a predetermined pattern obtained from a predetermined trace applied to original symbols of an original matrix;

determining that the login information does not match private account authentication information of the private account;

in response to the determining that the login information does not match the private account authentication information, generating a user matrix with a plurality of dynamic symbols for an alternate authentication of the private account;

generating a system password from the dynamic symbols by applying the predetermined pattern on the user matrix;

presenting the user matrix with the dynamic symbols electronically on the user device;

receiving a user password obtained by applying a user-provided trace pattern on at least two of the dynamic symbols of the user matrix;

determining whether the system password matches the user password; and in response to a determination that the system password matches the user password, confirming the alternate authentication of the private account to allow processing of the transaction.

16. The system of claim 15, wherein presenting the user matrix further causes the user device to display a prompt for receiving the user-provided trace pattern.

17. The system of claim 15, wherein at least one of the dynamic symbols is different from the original symbols.

18. The system of claim 15, wherein at least one of the dynamic symbols is different from the original symbols.

19. The system of claim 15, wherein the dynamic symbols are selected randomly.

20. The system of claim 15, wherein presenting the user matrix further causes the user device to display background fill obscuring one or more of the dynamic symbols.

* * * * *

UNITED STATES PATENT AND TRADEMARK OFFICE
CERTIFICATE OF CORRECTION

| | | |
|---|---|---|
| PATENT NO. | : 9,712,521 B2 | Page 1 of 1 |
| APPLICATION NO. | : 14/822834 | |
| DATED | : July 18, 2017 | |
| INVENTOR(S) | : Luis Vargas, Vishal Aggarwal and Yogesh Kandlur | |

It is certified that error appears in the above-identified patent and that said Letters Patent is hereby corrected as shown below:

In the Specification

In the Detailed Description:

In Column 3, Line 57, change "includes components M." to --includes components Mij.--.

In Column 3, Line 57, change "Index T may refer to" to --Index 'i' may refer to--.

In Column 4, Line 56, change "all of matrix elements in" to --all of matrix elements Mij in--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*